United States Patent
Maekubo et al.

(10) Patent No.: US 10,179,600 B2
(45) Date of Patent: Jan. 15, 2019

(54) STEERING WHEEL DECORATIVE MEMBER

(71) Applicant: KABUSHIKI KAISHA TOKAI RIKA DENKI SEISAKUSHO, Aichi (JP)

(72) Inventors: Yoshiaki Maekubo, Aichi (JP); Tamio Harada, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 15/712,706

(22) Filed: Sep. 22, 2017

(65) Prior Publication Data

US 2018/0086361 A1    Mar. 29, 2018

(30) Foreign Application Priority Data

Sep. 27, 2016    (JP) .................................. 2016-187936

(51) Int. Cl.
*B62D 1/06*    (2006.01)

(52) U.S. Cl.
CPC ..................................... *B62D 1/06* (2013.01)

(58) Field of Classification Search
CPC .................................... B62D 1/06; B62D 1/11
See application file for complete search history.

(56) References Cited

U.S. PATENT DOCUMENTS

| | | | | |
|---|---|---|---|---|
| 7,111,396 B2* | 9/2006 | Liuti | ................... | B29C 63/0073 |
| | | | | 29/894.1 |
| 8,656,804 B2* | 2/2014 | Nagata | ................ | B60R 16/0215 |
| | | | | 74/558 |
| 2006/0118538 A1* | 6/2006 | Jones | ..................... | B62D 1/065 |
| | | | | 219/204 |
| 2006/0257617 A1* | 11/2006 | Worrell | ..................... | B44C 5/06 |
| | | | | 428/90 |
| 2018/0009462 A1* | 1/2018 | Yamamoto | ............... | B62D 1/06 |
| 2018/0015941 A1* | 1/2018 | Hino | ........................ | B62D 1/06 |

FOREIGN PATENT DOCUMENTS

| | | |
|---|---|---|
| JP | 2000-142424 A | 5/2000 |
| JP | 2016011090 A | 1/2016 |

OTHER PUBLICATIONS

Extended European Search Report issued in the corresponding EP Application No. 17192825.2 dated Feb. 28, 2018.

* cited by examiner

*Primary Examiner* — Patrick Cicchino
(74) *Attorney, Agent, or Firm* — Roberts Mlotkowski Safran Cole & Calderon P.C.

(57) ABSTRACT

A steering wheel decorative member configured to be mounted on a resin member covering a periphery of a ring core of a steering wheel. An adhesion region in which the decorative member is adhered to the resin member is provided so that a width of the adhesion region is reduced from a central portion on a back surface facing the resin member toward a circumferential end portion.

6 Claims, 5 Drawing Sheets

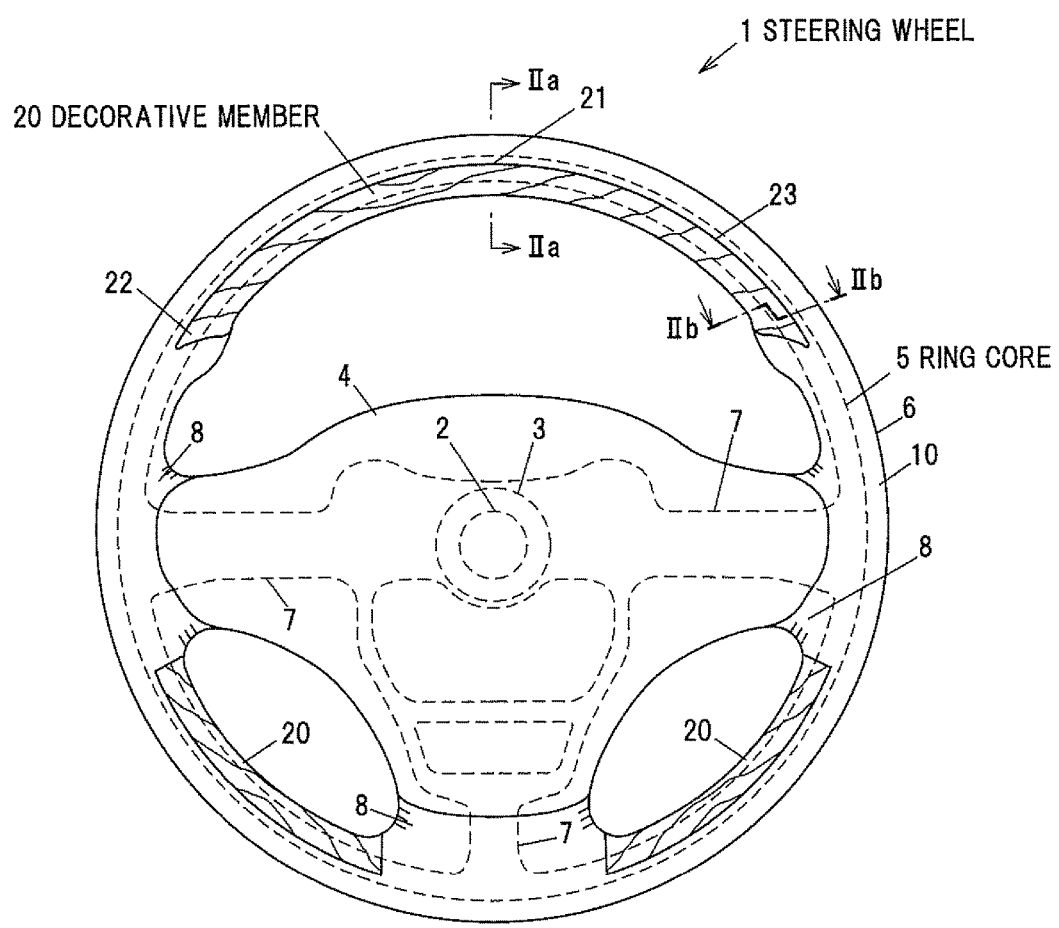

STEERING WHEEL DECORATIVE MEMBER

BACKGROUND

Technical Field

The present invention relates to a steering wheel decorative member that enhances the aesthetics of the front surface of a steering wheel, and particularly relates to a steering wheel decorative member that attaches to a ring portion of a steering wheel.

Related Art

As an example of a steering wheel having an enhanced outward appearance, a steering wheel in which a sliced veneer is attached to a ring portion is disclosed (refer to JP 2000-142424A discloses, for example).

In the steering wheel described in the above-described JP 2000-142424A, a fixing member for sliced veneer is fixed to a metal core with screws and the sliced veneer is attached to the front surface of the fixing member for sliced veneer with an adhesive.

According to the above-described JP 2000-142424A, the fixing member for sliced veneer is fixed to the metal core with screws, which enables the sliced veneer to be firmly fixed to the steering wheel via the fixing member for sliced veneer even under a condition where an impact is applied to the steering wheel.

SUMMARY

As described above, the steering wheel disclosed in the above-described JP 2000-142424A has such a configuration in which the sliced veneer is attached to the front surface of the fixing member for sliced veneer with an adhesive. According to this configuration, fractures, cracks, or the like can possibly develop in the sliced veneer, when, for example, a load acts on the steering wheel, a torsional load is applied to the steering wheel, and then a stress generated by the load applied through the steering wheel concentrates on one site of the sliced veneer. The above-described circumstance poses a challenge how the steering wheel is configured so that the impact resistance of a decorative member such as a sliced veneer is ensured.

Accordingly, an object of the invention is to provide a steering wheel decorative member capable of dispersing and reducing the stress concentratedly exerted on the steering wheel decorative member when a load acts on the steering wheel.

To achieve the above-described object, a decorative member according to the invention, configured to be mounted on a resin member covering a periphery of a ring core of a steering wheel is provided. In such a decorative member, an adhesion region in which the decorative member is adhered to the resin member is provided so that a width of the adhesion region is reduced from a central portion on a back surface facing the resin member toward circumferential end portions.

In the steering wheel decorative member according to the invention, it is preferable that the adhesion region be provided on an upper end side on an occupant-facing surface of the decorative member.

Furthermore, in the steering wheel decorative member according to the invention, the decorative member may be formed of a wood material.

According to the invention, when a load acts on the steering wheel, a stress concentratedly exerted on the decorative member can be dispersed and reduced.

BRIEF DESCRIPTION OF THE DRAWINGS

FIG. 1 is a schematic plan view illustrating an example of a steering wheel provided with a decorative member according to a preferred embodiment of the invention.

DESCRIPTION OF EMBODIMENTS

Figure 2A:
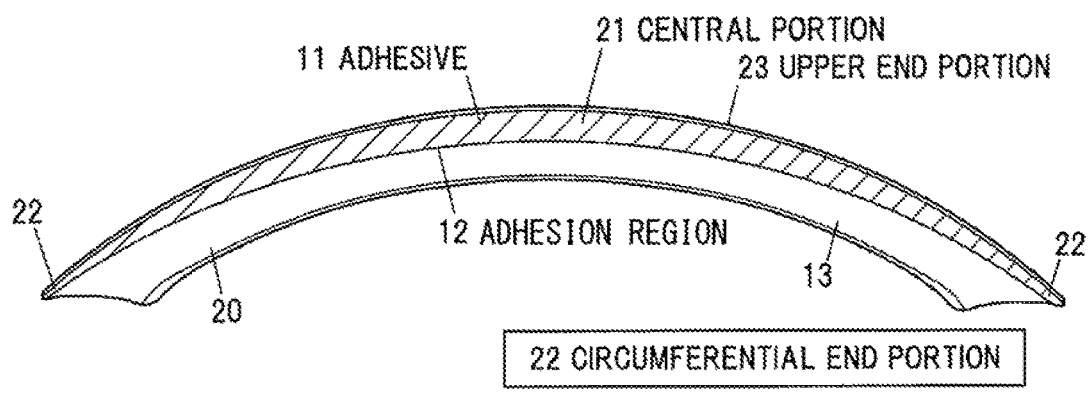
FIG. 2A is a schematic view of the back surface of the decorative member, illustrating an example of an adhesion region of the decorative member according to the embodiment.

Preferred embodiments of the invention will be described in detail hereinafter with reference to the appended drawings.

Configuration of Steering Wheel

In FIG. 1, a reference sign 1 indicating an overall configuration schematically indicates an automotive steering wheel provided with a typical decorative member 20 according to the present embodiment. Note that, in the description below, a front surface of the steering wheel 1 will also be referred to as a front portion, a back surface of the steering wheel 1 will also be referred to as a rear portion, and directions as viewed from the front surface of the steering wheel 1 are referred to as up, down, left, and right.

The steering wheel 1 according to an example illustrated in the drawings includes a cylindrical boss portion 3 fitted and fixed to the leading end of a steering shaft 2, a pad portion 4 attached to an upper portion of the boss portion 3, a ring portion 6 that covers a ring core 5, and spoke portions 8 that partially cover three spoke cores 7 that connect the ring core 5 of the ring portion 6 with the boss portion 3.

Figure 2B:
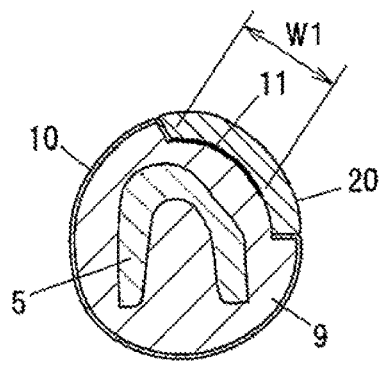
FIG. 2B is an enlarged view of a cross-section of a main part taken along line IIa-IIa in FIG. 1, illustrating an example of the adhesion region of the decorative member according to the embodiment.
Figure 2C:
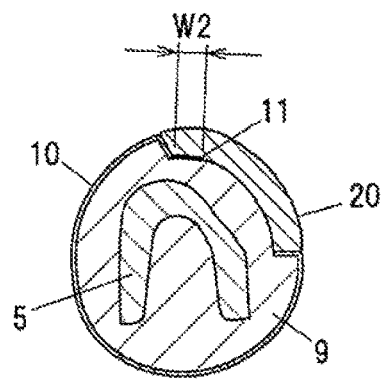
FIG. 2C is an enlarged view of a cross-section of a main part taken along lines IIb-IIb in FIG. 1, illustrating an example of the adhesion region of the decorative member according to the embodiment.

As illustrated in FIGS. 1, 2B, and 2C, a cover portion 9 made from a resin member such as polyurethane covers an outer circumferential portion of the ring portion 6 and an outer circumferential portion of the spoke portion 8. Attached to the surface of the cover portion 9 are a skin portion 10 made of leather, and the decorative member 20 having a design surface intended to improve an outward appearance design of the steering wheel 1.

Configuration of Decorative Member

The decorative member 20 illustrated in the drawings is composed of three members including a decorative member 20 provided on the top side, a decorative member 20 provided on the lower left side, and a decorative member 20 provided on the lower right side of the ring portion 6 that is a grip part to be gripped by a driver.

Next, a description is given of the decorative member 20. Note that the decorative members 20 provided on the lower left side and lower right side of the ring portion 6 have the same shape and structure as the decorative member 20 provided on top side of the ring portion 6. Accordingly, detailed descriptions of the decorative members 20 provided on the lower left side and lower right side are omitted.

As illustrated in FIG. 1, FIG. 2A, FIG. 2B, and FIG. 2C, the decorative member 20 constituting a design portion is formed of a wood material and a cross section of the decorative member 20 is a substantially semi-oval shape. The decorative member 20 is bent along the circumferential direction of the ring portion 6 and covers a substantially quadrant portion on the occupant-facing surface of the ring portion 6. The back surface of the decorative member 20 is fixed to the cover portion 9 with an adhesive 11.

Examples of the wood material include a walnut material, a maple material, a bamboo material, and the like. A material of the decorative member 20 is not limited to the wood material, and, for example, various types of resin materials can be used. From the perspective of enhancing the outward appearance design, the front surface of a resin material is preferably decorated with a wood grain pattern or the like. An epoxy-based adhesive or the like can be used as the adhesive 11, for example.

The decorative member 20 is bonded to the cover portion 9, formed of the resin member such as polyurethane, along the circumferential direction of the cover portion 9 with the adhesive 11. Thus, when a load acts on the steering wheel 1 thus configured, a stress is exerted on a portion of the decorative member 20 adhered with adhesive 11 in response to a deformation of the ring core 5 covered by the cover portion 9. When the stress concentratedly acts on one site of the decorative member 20, fractures, cracks, or the like can possibly develop in the decorative member 20.

The strength of the decorative member 20 depends on the material and/or thickness of the decorative member 20. On the other hand, it is effective that an adhesion region (area) of the adhesive 11 is properly determined in order to make a stress exerted on the portion adhered with the adhesive 11 less likely to concentrate on one site of the decorative member 20 when a load acts on the steering wheel 1.

It is preferable that an adhesion region 12, in which the back surface of the decorative member 20 is adhered and fixed to the cover portion 9, be provided so that the width of the adhesion region 12 is gradually reduced from a central portion 21 on the back surface, facing the cover portion 9, of the decorative member 20 toward both circumferential end portions 22 on the left and right sides in the circumferential direction.

In the illustrated example, the adhesion region 12 is provided so that the width thereof is gradually reduced from the central portion 21 on the back surface of the decorative member 20 toward both the circumferential end portions 22 on the left and right sides in the circumferential direction, which makes an adhesion width W2 at the circumferential end portions 22 narrower than an adhesion width W1 at the central portion 21. It is more preferable that the adhesion region 12 be provided on an upper end portion 23 side on an occupant-facing surface of the decorative member 20, which enables the stress that acts on the decorative member 20 to be reduced and the maximum stress to be dispersed.

A non-adhesion region 13, in which the back surface of the decorative member 20 is not adhered and fixed to the cover portion 9, is provided at an area other than the adhesion region 12 provided on the back surface of the decorative member 20. It is preferable that the non-adhesion region 13 be provided so that the width thereof is gradually increased from the central portion 21 on the back surface of the decorative member 20 toward both the circumferential end portions 22 on the left and right sides in the circumferential direction. A fixing part such as an elastic clip (not illustrated) for fixing the decorative member 20 to the ring portion 6 and/or a backing material (not illustrated) can be provided in the non-adhesion region 13, for example.

EXAMPLES 1, 2 AND COMPARATIVE EXAMPLES 1 TO 12

Description of further detailed examples of the invention will be given below together with comparative examples.

Figure 3:
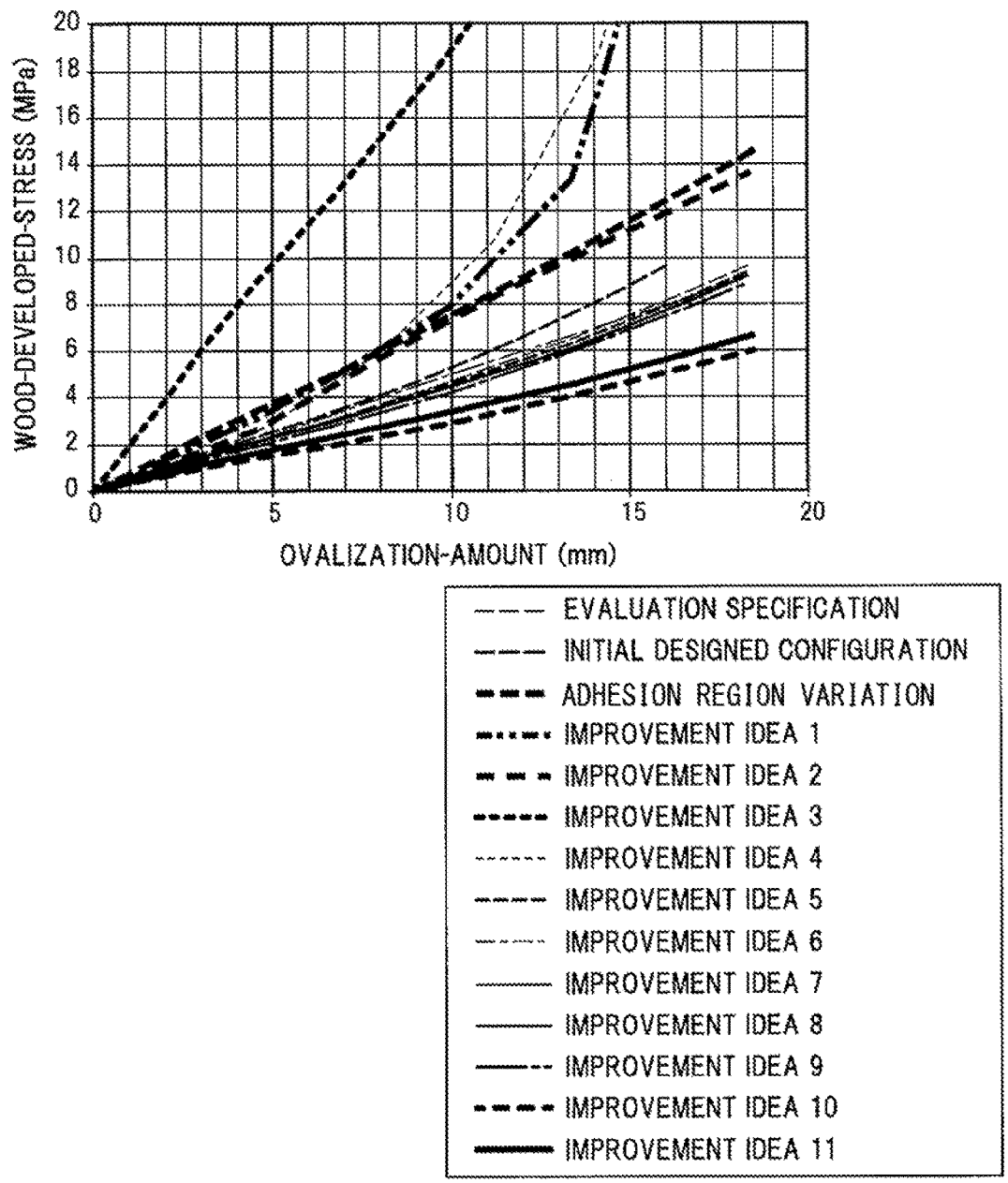
FIG. 3 is a diagram showing the relation between an ovalization-amount of a wood member constituting the decorative member and a stress.

FIG. 3 shows the relation between ovalization-amounts (mm) of wood members and a wood-developed-stress (MPa) which develops in the wood members. The wood members are formed in accordance with improvement proposals 10, 11 (hereinafter, referred to as Examples 1, 2 in this order), an evaluation specification, an initial designed configuration, an adhesion region variation, and improvement proposals 1 to 9 (hereinafter, referred to as Comparative Examples 1 to 12 in this order). The wood members of Examples 1, 2 and Comparative Examples 1 to 12 have various shapes and adhesion regions and are each adhered and fixed to the cover portion 9 of the steering wheel 1.

In FIG. 3, the horizontal axis corresponds to the history of an ellipse-amount (ovalization-amount), which indicates the degree of ovalization of a wood member while the vertical axis corresponds to the history of a stress that acts on a wood member relative to a variation in the ovalization-amount. The ovalization-amount indicates a difference (mm) between a major axis and a minor axis of an oval cross-section of a wood member.

Figure 4A:
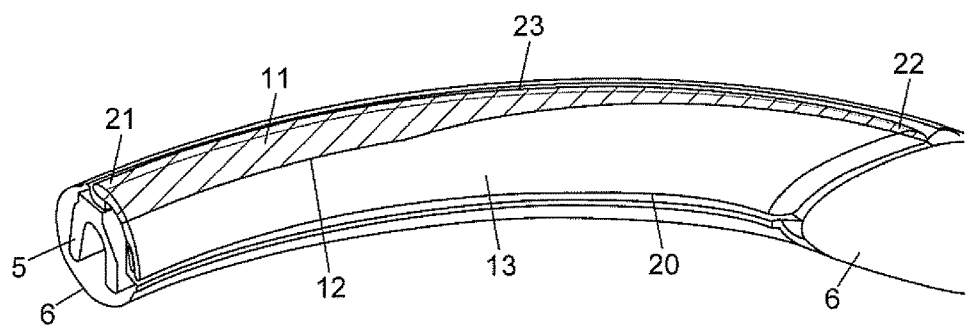
FIG. 4A is a partial schematic perspective view of the decorative member according to the embodiment, illustrating an example of a stress distribution in the decorative member.
Figure 5:
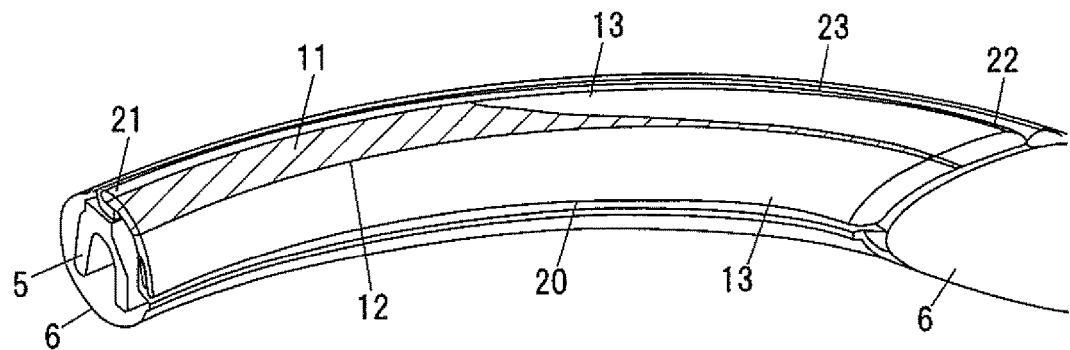
FIG. 5 is a partial schematic perspective view corresponding to FIG. 4A, illustrating an example of an adhesion region of a decorative member according to a modified example.

The respective wood members of Examples 1, 2 are provided with two different adhesion areas, to which an adhesive is applied. As illustrated in FIG. 4A and FIG. 5, such adhesion areas are gradually reduced in the circumferential direction from the central portion of an upper half of the wood member in a direction along the major axis of the ellipse.

On the other hand, the wood members of Comparative Examples 1 to 3 include a wood member having a back surface entirely applied with an adhesive, a wood member having various external shapes and adhesion regions, or a wood member having a non-adhered portion formed linearly in the circumferential direction.

The wood members of Comparative Examples 4 to 7 include a wood member, some portion of which is formed thinner. The wood members of Comparative Examples 8 to 11 include a wood member, some portion of which extending in the circumferential direction is formed thinner regardless of an adhered portion with the cover portion 9. The wood member of Comparative Example 12 is a backed wood member.

FIG. 3 clearly shows that an increase rate of the stress that acts on each of the wood members constituting the decorative members of Comparative Examples 1 to 12 is increased along with an increase in the ovalization-amount compared with increase rates of Examples 1, 2.

In contrast, a stress on the wood members constituting the decorative members of Examples 1, 2 gradually increases along with the increase in the ovalization-amount, but is smaller than the stress on the wood members constituting the decorative members of Comparative Examples 1 to 12. In other words, the stress that acts on the decorative members of Examples 1, 2 can be kept low regardless of an ellipse-amount.

FIG. 4A to 4D, FIG. 5 and FIG. 6A, 6B illustrate respective examples of stress distributions in the decorative members 20, 100, resulting from comparisons between a stress that acts on the decorative members 20 of Examples 1, 2 and a stress that acts on the decorative members 100 of Comparative Example. Note that these diagrams illustrate half portions of the decorative members 20, 100 in the circumferential direction extending from the central portion 21 to the circumferential end portions 22.

Figure 4B:
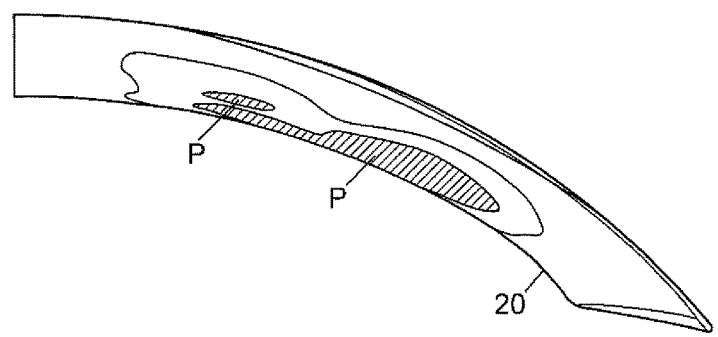
FIG. 4B is a partial schematic front view of the decorative member according to the embodiment, illustrating an example of the stress distribution in the decorative member.
Figure 4C:
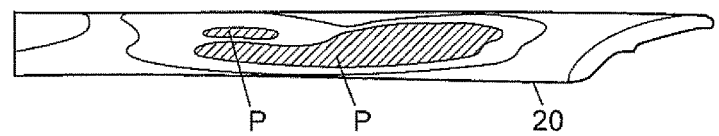
FIG. 4C is a partial schematic side view of the decorative member according to the embodiment, illustrating an example of the stress distribution in the decorative member.
Figure 4D:
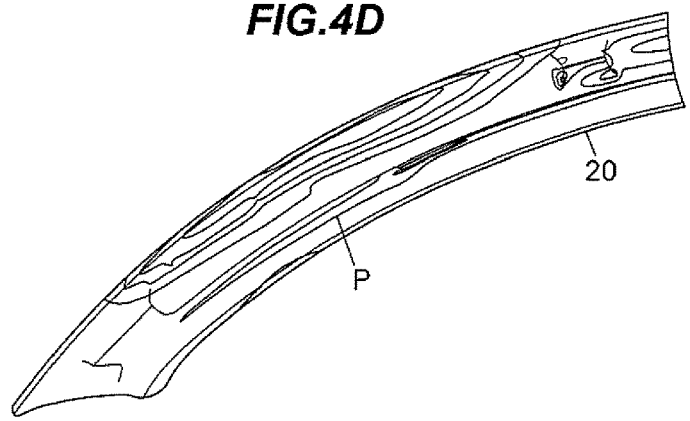
FIG. 4D is a partial schematic rear view of the decorative member according to the embodiment, illustrating an example of the stress distribution in the decorative member.
Figure 6A:
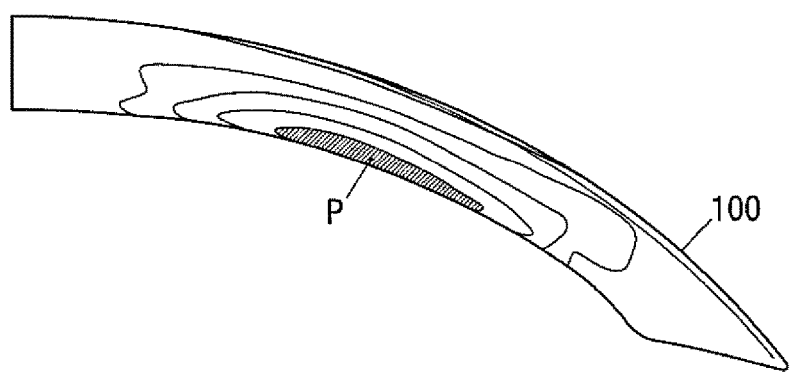
FIG. 6A is a partial schematic front view of a decorative member according a comparative example, illustrating an example of a stress distribution in the decorative member.
Figure 6B:
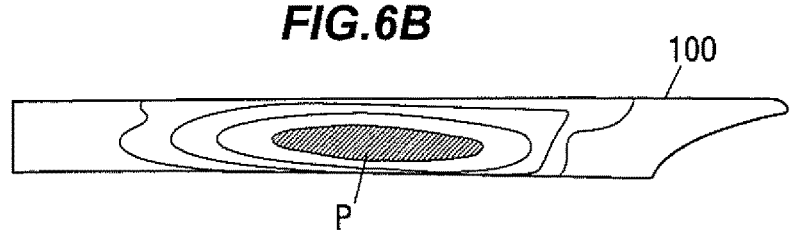
FIG. 6B is a partial schematic side view of the decorative member according to the comparative example, illustrating an example of the stress distribution in the decorative member.

FIG. 4A illustrates an example of the adhesion region 12 of the decorative member 20 of Example 1, while FIG. 4B, FIG. 4C and FIG. 4D illustrate an example of a distribution of a stress that acts on the decorative member 20. FIG. 5 illustrates an example of the adhesion region 12 of the decorative member 20 of Example 2. FIG. 6A and FIG. 6B illustrate an example of a distribution of a stress that acts on the decorative member 100 as Comparative Example.

As evident from these diagrams, the decorative member 20 of Example 1 illustrated in FIG. 4A is configured so that the adhesion region 12, in which the back surface of the decorative member 20 is adhered and fixed to the cover portion 9, is provided on the upper end portion 23 side on the occupant-facing surface of the decorative member 20 and that the width of the adhesion region 12 is gradually reduced from the central portion 21 on the back surface facing the cover portion 9 of the decorative member 20 toward the circumferential end portions 22.

As illustrated in FIG. 4B, FIG. 4C and FIG. 4D, in the decorative member 20 having such an adhesion region 12, an area (maximum stress area) P on which the maximum stress acts in the cross-sectional direction of the decorative member 20 extends in the circumferential direction of the decorative member 20. Compared with the decorative member 100 of Comparative Example illustrated in FIG. 6A, 6B, it can be seen that the maximum stress that acts on the decorative member 20 is dispersed and reduced.

In the decorative member 20 illustrated in FIG. 5 of Example 2 also, the adhesion region 12, in which the back surface of the decorative member 20 is adhered and fixed to the cover portion 9, is provided on the upper end portion 23 side on the occupant-facing surface of the decorative member 20.

The width of the adhesion region 12 is gradually reduced from the central portion 21 on the back surface of the decorative member 20 toward the circumferential end portions 22, while the width of the non-adhesion region 13 is gradually increased from the central portion 21 on the back surface of the decorative member 20 toward the circumferential end portions 22. As with Example 1, the maximum stress that acts on the decorative member 20 can be dispersed and reduced.

It can be assumed that the above-described effect results from the fact that the adhesion width W2 of the circumferential end portions 22 of the decorative member 20 is narrower than the adhesion width W1 of the central portion 21, making the circumferential end portions 22 of the decorative member 20 less likely to follow a deformation of the ring core 5 and thus making the decorative member 20 less likely to deform depending on the extent that the decorative member 20 becomes less likely to follow the deformation of the ring core 5, which allows a stress that acts on the decorative member 20 to be decreased.

In contrast, in the decorative member 100 of Comparative Example illustrated in FIG. 6A and FIG. 6B, a stress that acts on the decorative member 100 tends to be great compared with a stress that acts on the decorative member 20 illustrated in FIG. 4B, FIG. 4C and FIG. 4D. Further, it is seen that the maximum stress area P, which acts on the decorative member 100 concentratedly acts on one site of the decorative member 100. The maximum stress concentratedly acts on one site of the decorative member 100, which makes the decorative member 100 susceptible to a buffer load. Thus, such a configuration is not suitable for a practical use.

It can be understood from the above that in order to obtain the decorative member 20, of which a stress is less likely to concentrate on one site, a decorative member 20 having the adhesion region 12 that is gradually reduced in width from the central portion 21 on the back surface facing the cover portion 9 toward the circumferential end portions 22, can be used. Such a decorative member 20 has an impact resistance that does not practically cause a trouble.

Effect of Embodiments

With the steering wheel decorative member 20 having the above-described configuration, the following effects can be obtained in addition to the above-described effects.

The adhesion region 12 of the adhesive 11 for adhering and fixing the back surface of the decorative member 20 to the cover portion 9 is adjusted, so that an impact resistance of the decorative member 20 can be enhanced.

When the steering wheel 1 deforms, a deformation of the decorative member 20 following the deformation of the ring core 5 can be regulated. Thus, a generation of distortion in a twisting direction can be suppressed.

The adhesion region 12 is provided so that a stress that acts on the portion adhered with the adhesive 11 is less likely to concentrate on one site of the decorative member 20, which causes the stress that acts on the decorative member 20 to be dispersed and reduced even when the stress has acted on the portion adhered with the adhesive 11. Accordingly, a separation at an interface between the decorative member 20 and the cover portion 9 can be less likely to occur.

In the representative examples of the steering wheel decorative member 20 according to the invention, a configuration where the decorative member is applied to an automobile has been described. However, the invention is not limited to such a configuration and can of course be effectively applied to various types of work vehicles such as construction machinery, and agricultural machinery.

As apparent from the above, the invention according to the scope of the claims is not limited by the representative embodiments, modified examples, and illustrated examples of the invention described above. As such, it should be understood that all combinations of the features described in the embodiments, modified examples, and illustrated examples are not required parts of the means to solve the problems of the invention.

The invention claimed is:

1. A steering wheel decorative member configured to be mounted on a resin member covering a periphery of a ring core of a steering wheel,
   wherein an adhesion region in which the decorative member is adhered to the resin member is provided so that a width of the adhesion region is reduced from a central portion on a back surface facing the resin member toward a circumferential end portion,
   wherein the back surface of the decorative member comprises a non-adhesion region in which the decorative member is not adhered to the resin member, and
   wherein a width of the non-adhesion region increases from the central portion toward the circumferential end portion.

2. The steering wheel decorative member according to claim 1, wherein the adhesion region is provided on an upper end side on an occupant-facing surface of the decorative member.

3. The steering wheel decorative member according to claim 1, wherein the decorative member comprises a wood material.

4. The steering wheel decorative member according to claim 2, wherein the decorative member comprises a wood material.

5. The steering wheel decorative member according to claim 1, wherein the adhesion region is formed such that the width thereof decreases from one to an other of both circumferential end portions.

6. The steering wheel decorative member according to claim 5, wherein the back surface of the decorative member comprises a non-adhesion region in which the decorative member is not adhered to the resin member, and
   wherein a width of the non-adhesion region increases from the one to the other of the both circumferential end portions.

* * * * *